US012264267B2

(12) United States Patent
Hemmi et al.

(10) Patent No.: US 12,264,267 B2
(45) Date of Patent: Apr. 1, 2025

(54) RESIN COMPOSITION, AND FILM FOR LID MATERIALS

(71) Applicant: TOSOH CORPORATION, Shunan (JP)

(72) Inventors: Takashi Hemmi, Yokkaichi (JP); Isao Morishita, Yokkaichi (JP); Shingo Kouda, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 644 days.

(21) Appl. No.: 17/441,735

(22) PCT Filed: Mar. 18, 2020

(86) PCT No.: PCT/JP2020/011976
§ 371 (c)(1),
(2) Date: Sep. 22, 2021

(87) PCT Pub. No.: WO2020/196157
PCT Pub. Date: Oct. 1, 2020

(65) Prior Publication Data
US 2022/0213356 A1    Jul. 7, 2022

(30) Foreign Application Priority Data

Mar. 25, 2019  (JP) .................................. 2019-056363

(51) Int. Cl.
| | |
|---|---|
| *C09J 123/08* | (2006.01) |
| *B32B 27/08* | (2006.01) |
| *B32B 27/18* | (2006.01) |
| *B32B 27/30* | (2006.01) |
| *B32B 27/32* | (2006.01) |
| *C09K 3/10* | (2006.01) |

(52) U.S. Cl.
CPC ......... *C09J 123/0853* (2013.01); *B32B 27/08* (2013.01); *B32B 27/18* (2013.01); *B32B 27/302* (2013.01); *B32B 27/306* (2013.01); *B32B 27/32* (2013.01); *C09K 3/1006* (2013.01); *B32B 2270/00* (2013.01); *B32B 2307/748* (2013.01); *B32B 2435/02* (2013.01); *C09K 2200/062* (2013.01); *C09K 2200/0622* (2013.01)

(58) Field of Classification Search
None
See application file for complete search history.

(56) References Cited

U.S. PATENT DOCUMENTS

| | | | | | |
|---|---|---|---|---|---|
| 3,607,330 | A | * | 9/1971 | Blades | C08K 5/101 106/169.34 |
| 3,625,862 | A | * | 12/1971 | Freamo | F16K 47/00 560/243 |
| 3,906,036 | A | * | 9/1975 | Dirks | C07C 67/055 560/243 |
| 4,028,436 | A | * | 6/1977 | Bogan | C08F 255/02 526/272 |
| 4,031,162 | A | * | 6/1977 | Brax | B29C 48/21 156/244.14 |
| 4,053,540 | A | * | 10/1977 | Argurio | C08K 5/103 524/110 |
| 4,200,709 | A | * | 4/1980 | Hoyt | C08F 8/12 525/62 |
| 4,247,584 | A | * | 1/1981 | Widiger | B32B 27/08 264/171.26 |
| 4,278,738 | A | * | 7/1981 | Brax | B29C 48/21 156/244.11 |
| 4,397,883 | A | * | 8/1983 | Serlin | C08F 8/44 428/323 |
| 4,439,574 | A | * | 3/1984 | Schuppiser | C08F 218/08 526/201 |
| 4,448,807 | A | * | 5/1984 | Serlin | C08F 8/44 428/323 |
| 4,471,086 | A | * | 9/1984 | Foster | C09J 151/06 524/487 |

(Continued)

FOREIGN PATENT DOCUMENTS

| | | |
|---|---|---|
| CN | 108070330 A | 5/2018 |
| JP | 06-328632 A | 11/1994 |

(Continued)

OTHER PUBLICATIONS

International Search Report dated Jun. 2, 2020 from the International Searching Authority in International Application No. PCT/JP2020/011976.

(Continued)

*Primary Examiner* — Kevin R Kruer
(74) *Attorney, Agent, or Firm* — Sughrue Mion, PLLC

(57) ABSTRACT

The purpose is to provide a resin composition and a film for lid material which excel in sealability and adhesiveness to plastic containers, especially containers made of polyethylene terephthalate, polylactic acid, polystyrene, or polypropylene, and are suitably usable as sealant layers of lid materials for containers. Provided is a resin composition including: an ethylene-vinyl acetate copolymer (A) by 60-95 parts by weight, the ethylene-vinyl acetate copolymer (A) having a vinyl acetate content (VA) of 3-13% by weight, and having a ratio Qw between a weight-average molecular weight (Mw) and a number-average molecular weight (Mn) of 1.5-4.5; and a tackifier resin (B) by 5-40 parts by weight, where a total amount of (A) and (B) is 100 parts by weight.

13 Claims, No Drawings

(56) References Cited

U.S. PATENT DOCUMENTS

| | | | | | |
|---|---|---|---|---|---|
| 4,534,799 | A | * | 8/1985 | Aguirre | C08K 5/20 524/158 |
| 4,547,433 | A | * | 10/1985 | Ohya | B29C 61/0616 426/127 |
| 5,208,367 | A | * | 5/1993 | Ou | C07C 67/54 560/248 |
| 5,232,553 | A | * | 8/1993 | Smigo | D21H 11/14 162/147 |
| 5,300,566 | A | * | 4/1994 | Pinschmidt, Jr. | C08F 8/12 525/61 |
| 5,472,613 | A | * | 12/1995 | Schofield | B01D 61/00 210/321.89 |
| 11,603,420 | B2 | * | 3/2023 | Shin | C08F 2/02 |
| 2003/0096101 | A1 | * | 5/2003 | Kazeto | C09D 129/02 428/323 |
| 2003/0114583 | A1 | * | 6/2003 | Stark | C08F 220/12 524/588 |
| 2003/0134982 | A1 | * | 7/2003 | Hoch | B32B 27/08 428/475.8 |
| 2004/0097638 | A1 | * | 5/2004 | Centner | C09J 7/245 524/561 |
| 2005/0228129 | A1 | * | 10/2005 | Tsai | C08F 6/003 525/59 |
| 2006/0142623 | A1 | * | 6/2006 | Yoda | B22C 7/02 208/20 |
| 2006/0212072 | A1 | * | 9/2006 | Cuevas | A61L 17/04 606/228 |
| 2007/0117905 | A1 | * | 5/2007 | Toyoda | C08L 23/02 524/487 |
| 2007/0250214 | A1 | * | 10/2007 | Lee | C08F 10/00 700/266 |
| 2008/0242779 | A1 | * | 10/2008 | Gaggar | C08L 33/12 524/487 |
| 2009/0186954 | A1 | * | 7/2009 | Okamura | C08J 9/0061 521/60 |
| 2009/0269531 | A1 | * | 10/2009 | Arnould | B32B 27/08 525/71 |
| 2011/0166257 | A1 | * | 7/2011 | Bohling | C09D 131/04 523/328 |
| 2012/0061607 | A1 | * | 3/2012 | McLennan | D04H 3/004 252/62 |
| 2012/0102825 | A1 | * | 5/2012 | Chevrot | C10L 10/16 44/388 |
| 2014/0046102 | A1 | * | 2/2014 | D'Amato | C08K 5/09 585/17 |
| 2016/0083628 | A1 | * | 3/2016 | Heimink | C09C 3/12 556/466 |
| 2017/0009067 | A1 | * | 1/2017 | Garcia Castro | F17D 1/17 |
| 2017/0283525 | A1 | * | 10/2017 | Li | C08F 8/50 |
| 2018/0002579 | A1 | * | 1/2018 | Hu | A61L 15/58 |
| 2019/0263947 | A1 | * | 8/2019 | Sripothongnak | C08F 210/00 |
| 2021/0024667 | A1 | * | 1/2021 | Sung | C08F 210/02 |
| 2022/0081653 | A1 | * | 3/2022 | Ma | C11D 3/3723 |
| 2022/0154049 | A1 | * | 5/2022 | Fujii | B29B 7/286 |
| 2022/0213356 | A1 | * | 7/2022 | Hemmi | B32B 27/18 |
| 2022/0250024 | A1 | * | 8/2022 | Berthier | C11D 3/505 |
| 2022/0306846 | A1 | * | 9/2022 | Delevati | C08K 5/14 |
| 2023/0227595 | A1 | * | 7/2023 | Sawa | C09D 11/106 524/555 |
| 2024/0158333 | A1 | * | 5/2024 | Zhang | C07C 67/05 |
| 2024/0279930 | A1 | * | 8/2024 | Mercado | E04D 1/22 |

FOREIGN PATENT DOCUMENTS

| | | |
|---|---|---|
| JP | 8-253631 A | 10/1996 |
| JP | 9-111208 A | 4/1997 |
| JP | 11-181176 A | 7/1999 |
| JP | 11-206869 A | 8/1999 |
| JP | 11-269319 A | 10/1999 |
| JP | 2003-2923 A | 1/2003 |
| JP | 2005-35567 A | 2/2005 |
| JP | 2009-29901 A | 2/2009 |
| JP | 2009-143215 A | 7/2009 |
| JP | 2009-148996 A | 7/2009 |
| JP | 4438108 B2 | 3/2010 |
| JP | 2016-188337 A | 11/2016 |
| JP | 2018-76398 A | 5/2018 |

OTHER PUBLICATIONS

International Preliminary Report on Patentability with the translation of Written Opinion dated Sep. 28, 2021 from the International Bureau in International Application No. PCT/JP2020/011976.

Office Action dated Nov. 29, 2022 from the Chinese Patent Office in Application No. 202080023679.X.

Japanese Office Action issued Feb. 6, 2024 in Application No. 2020-046352.

* cited by examiner

RESIN COMPOSITION, AND FILM FOR LID MATERIALS

CROSS REFERENCE TO RELATED APPLICATIONS

This application is a National Stage of International Application No. PCT/JP2020/011976 filed Mar. 18, 2020, claiming priority based on Japanese Patent Application No. 2019-056363 filed Mar. 25, 2019, the entire disclosures of which are incorporated by reference herein.

TECHNICAL FIELD

The present invention relates to a resin composition used in a lid material for a container, more particularly, to a resin composition for adhesion which has high sealability and adhesiveness with respect to a container and can be suitably used for a sealant of a lid material, and to a film for a lid material including the resin composition as a sealant layer.

BACKGROUND ART

Conventionally, plastic containers made of materials such as polyethylene, polypropylene, and polystyrene and paper containers mainly made of paper have been used for packaging of food and drink, pharmaceuticals, industrial parts, and the like. As a lid material thereof, an easily releasable film is used which has stable adhesiveness for protecting the content and has easy releasability with which the film can be detached (i.e., opened) with appropriate strength.

So far, many materials for easily releasable films have already been known for containers made of materials such as polypropylene and polystyrene. However, in recent years, there has not been found an easily releasable film which is excellent in practical use for a container made of amorphous polyethylene terephthalate (hereinafter, referred to as "A-PET") that has been increasingly used because A-PET is not expensive and is excellent in transparency and cold resistance. The conventional easily releasable film has the following problems when used for a lid material for an A-PET container: that is, a lid opens due to vibration or drop during transportation or storage because adhesive strength is low; and, as a result of setting a heat sealing temperature to be high in order to obtain high adhesion strength, the container is deformed and sealing property is deteriorated. In addition, there is a disadvantage that the sealing strength is lowered when stored in a low temperature environment after adhesion. Thus, the conventional easily releasable film has problems in practical use.

Generally, as an adhesive agent for a lid material sealant, a mixture is known which is composed of polyethylene, an ethylene-vinyl acetate copolymer, an ethylene-α-olefin copolymer, or the like and a tackifier. However, in such a material, adhesive strength and sealing strength may not be sufficiently obtained for containers made of a wide variety of materials ranging from polyolefin to A-PET. Therefore, the following problems are caused: that is, a lid opens due to vibration or drop during transportation or storage because adhesive strength is low; and, as a result of setting a heat sealing temperature to be high in order to obtain high adhesion strength, the container is deformed and sealability is deteriorated. Although a resin composition composed of an ethylene-α-olefin copolymer and an olefin-based elastomer and/or a styrene-based elastomer and a tackifier (see, for example, Patent Literature 1), and a sealing material composed of an ethylene-α-olefin copolymer, an ethylene-polar monomer copolymer, an A-B-A type block copolymer, and a tackifier (see, for example, Patent Literature 2) are used, molding processability, sealing strength, and adhesion strength of those materials are not all satisfactory.

In recent years, demand for biodegradable plastics has been increasing due to heightened awareness of environmental conservation. In the field of food packaging materials, the used amount of biodegradable plastics such as polylactic acid (PLA) as a material for containers is increasing. However, it cannot be said that the conventional adhesive resin for a sealant used for a lid material has enough adhesiveness with respect to PLA and the like, and an adhesive resin which can be suitably used for those applications has been demanded.

CITATION LIST

Patent Literature

Patent Literature 1

Japanese Patent Application Publication No. 1999-269319

Patent Literature 2

Japanese Patent No. 4438108

SUMMARY OF INVENTION

Technical Problem

An object of the present invention is to provide a resin composition which excels in sealability and adhesiveness with respect to plastic containers, especially containers made of polyethylene terephthalate, polylactic acid, polystyrene, and/or polypropylene, and can be suitably used as a sealant layer of a lid material for a container, and to provide a film for a lid material having such properties.

Solution to Problem

As a result of diligent studies on the above problems, the inventors of the present invention have found that a resin composition containing an ethylene-vinyl acetate copolymer having specific properties and a tackifier is excellent in sealability and adhesiveness with respect to various plastic containers made of materials including A-PET and polylactic acid, and have accomplished the present invention.

That is, the present invention can be expressed as in the following [1] through [12]:

[1] A resin composition including: an ethylene-vinyl acetate copolymer (A) in an amount of not less than 60 parts by weight and not more than 95 parts by weight, the ethylene-vinyl acetate copolymer (A) having a vinyl acetate content (VA) of not less than 3% by weight and not more than 13% by weight, and having a ratio Qw between a weight-average molecular weight (Mw) and a number-average molecular weight (Mn) of 1.5 or more and 4.5 or less; and a tackifier resin (B) in an amount of not less than 5 parts by weight and not more than 40 parts by weight, where a total amount of (A) and (B) is 100 parts by weight.

[2] A resin composition, including: a resin composition described in [1]; and a thermoplastic block copolymer (C) in an amount of not less than 0.5 parts by weight and not more than 5 parts by weight relative to 100 parts by weight of the resin composition described in [1], the thermoplastic block copolymer (C) containing at least one of olefin and diolefin as a constitutional unit and containing aromatic vinyl hydrocarbon as a constitutional unit.

[3] A resin composition, including: a resin composition described in [1]; and an ethylene-α-olefin copolymer (D) in an amount of not less than 5 parts by weight and not more than 100 parts by weight relative to 100 parts by weight of the resin composition described in [1], the ethylene-α-olefin copolymer (D) having a density that is measured based on JIS K6922-1 (1998) and falls within a range of 860 kg/m³ or more and 910 kg/m³ or less.

[4] A resin composition, including: a resin composition described in [1]; and low density polyethylene (E) in an amount of not less than 1 part by weight and not more than 50 parts by weight relative to 100 parts by weight of the resin composition described in [1], the low density polyethylene (E) having a number-average molecular weight that falls within a range of 500 to 18000, and having a melting point that is measured based on JIS K6924-2 and falls within a range of 98° C. or more and 120° C. or less.

[5] A resin composition, including: a resin composition described in [1]; and a saponified ethylene-vinyl acetate copolymer (F) in an amount of not less than 1 part by weight and not more than 100 parts by weight relative to 100 parts by weight of the resin composition described in [1], the saponified ethylene-vinyl acetate copolymer (F) having a melting point that is measured based on JIS K6924-2 and is 90° C. or more and 120° C. or less.

[6] A resin composition, including: a resin composition described in [1]; a thermoplastic block copolymer (C) in an amount of not less than 0.5 parts by weight and not more than 5 parts by weight relative to 100 parts by weight of the resin composition described in [1], the thermoplastic block copolymer (C) containing at least one of olefin and diolefin as a constitutional unit and containing aromatic vinyl hydrocarbon as a constitutional unit; and an ethylene-α-olefin copolymer (D) in an amount of not less than 5 parts by weight and not more than 100 parts by weight relative to 100 parts by weight of the resin composition described in [1], the ethylene-α-olefin copolymer (D) having a density that is measured based on JIS K6922-1 (1998) and falls within a range of 860 kg/m³ or more and 910 kg/m³ or less.

[7] A resin composition, including: a resin composition described in [1]; a thermoplastic block copolymer (C) in an amount of not less than 0.5 parts by weight and not more than 5 parts by weight relative to 100 parts by weight of the resin composition described in [1], the thermoplastic block copolymer (C) containing at least one of olefin and diolefin as a constitutional unit and containing aromatic vinyl hydrocarbon as a constitutional unit; and low density polyethylene (E) in an amount of not less than 1 part by weight and not more than 50 parts by weight relative to 100 parts by weight of the resin composition described in [1], the low density polyethylene (E) having a number-average molecular weight that falls within a range of 500 to 18000, and having a melting point that is measured based on JIS K6924-2 and falls within a range of 98° C. or more and 120° C. or less.

[8] A resin composition, including: a resin composition described in [1]; a thermoplastic block copolymer (C) in an amount of not less than 0.5 parts by weight and not more than 5 parts by weight relative to 100 parts by weight of the resin composition described in [1], the thermoplastic block copolymer (C) containing at least one of olefin and diolefin as a constitutional unit and containing aromatic vinyl hydrocarbon as a constitutional unit; and a saponified ethylene-vinyl acetate copolymer (F) in an amount of not less than 1 part by weight and not more than 100 parts by weight relative to 100 parts by weight of the resin composition described in [1], the saponified ethylene-vinyl acetate copolymer (F) having a melting point that is measured based on JIS K6924-2 and is 90° C. or more and 120° C. or less.

[9] The resin composition described in any one of [1] through [8], in which the tackifier resin (B) is at least one resin selected from the group consisting of an aliphatic petroleum resin, an aromatic petroleum resin, an alicyclic hydrogenated petroleum resin, and a copolymer-based petroleum resin.

[10] An adhesive agent for a sealant, the adhesive agent containing a resin composition described in any one of [1] through [9].

[11] The adhesive agent described in [10], which is used for a container that is made of at least one material selected from the group consisting of polyethylene terephthalate, polystyrene, polypropylene, and polylactic acid.

[12] A film for a lid material for a container, the film including at least two layers which include a layer containing a resin composition described in any one of [1] through [9] and a supportive base layer.

Advantageous Effects of Invention

According to the present invention, it is possible to provide the resin composition which benefits production of an adhesive layer for a sealant of a lid material for a container and which excels in sealability and adhesiveness with respect to various kinds of plastic containers, especially containers made of polyethylene terephthalate, polylactic acid, polystyrene, and/or polypropylene.

DESCRIPTION OF EMBODIMENTS

The following description will discuss details of a resin composition which is one aspect of the present invention.

An ethylene-vinyl acetate copolymer (A) included in the present invention has a vinyl acetate content of not less than 3% by weight and not more than 15% by weight, preferably not less than 3% by weight and not more than 13% by weight, further preferably not less than 5% by weight and not more than 10% by weight. If the vinyl acetate content is less than 3% by weight, an obtained composition is not preferable because of inferior low-temperature heat sealability thereof. Meanwhile, if the vinyl acetate content is more than 15% by weight, an obtained composition is not preferable because of inferior molding processability and adhesion strength thereof.

Here, the vinyl acetate content in the ethylene-vinyl acetate copolymer can be measured by a method in conformity to JIS K 6924-1.

The ethylene-vinyl acetate copolymer (A) included in the present invention has a ratio Mw/Mn between a weight-average molecular weight (Mw) and a number-average molecular weight (Mn) thereof (hereinafter referred to as "Qw") of 1.5 or more and 4.5 or less, preferably 2.0 or more and 4.5 or less, more preferably 2.5 or more and 4.2 or less. Qw which is less than 1.5 is not preferable because an extrusion load during a molding process becomes higher and energy consumption becomes greater. Moreover, Qw exceeding 4.5 is not preferable because adhesion strength and sealing strength of the composition in accordance with an aspect of the present invention become lower.

Here, the weight-average molecular weight (Mw) and the number-average molecular weight (Mn) of the ethylene-vinyl acetate copolymer (A) can be calculated as molecular weights of linear polyethylene by measuring a universal calibration curve using, for example, gel permeation chromatography.

Further, according to the ethylene-vinyl acetate copolymer (A) included in the present invention, it is preferable that the vinyl acetate content VA (unit: % by weight) and Qw satisfy the following relational expression (1) because adhesion strength and sealing strength of the composition in accordance with an aspect of the present invention are enhanced.

$$Qw < -1.9 \times \ln VA + 9.0 \quad (1):$$

Here, ln VA represents a natural logarithm of the vinyl acetate content VA (% by weight).

The ethylene-vinyl acetate copolymer (A) included in the present invention can be obtained by a known production method, and there is no particular limitation on the production method. A method of radical polymerization under high pressure using a tubular (tubular type) reactor is preferable because it is possible to easily obtain the ethylene-vinyl acetate copolymer having the vinyl acetate content and Qw which meet the requirements of the present invention.

The ethylene-vinyl acetate copolymer (A) in the present invention can be either a single component or a composition containing two or more kinds of copolymers. In a case where the copolymer (A) is a composition, the vinyl acetate content of the composition means a value measured using the foregoing method of JIS K 6924-1 with respect to the composition. Similarly, Qw of the composition means a value measured using the method based on the foregoing gel permeation chromatography with respect to the composition. It is only necessary that the vinyl acetate content and the ratio Qw between the weight-average molecular weight and the number-average molecular weight obtained for the composition satisfy the requirements of the ethylene-vinyl acetate copolymer (A).

The tackifier resin (B) included in the present invention can be any tackifier resin, provided that the resin belongs to the category of tackifier resins. Examples of the tackifier resin (B) include synthetic petroleum resin-based tackifiers such as a petroleum resin-based tackifier, a coumarone resin-based tackifier, and a styrene-based tackifier; natural resin-based tackifiers such as a rosin-based resin, a methyl ester-based resin, a glycerin ester-based resin, a pentaerythritol ester-based resin, and a terpene-based resin; modified products thereof; and the like. Among those tackifier resins, examples of the synthetic petroleum resin-based tackifier include an aliphatic petroleum resin, an aliphatic hydrogenated petroleum resin, an aromatic petroleum resin, an aromatic hydrogenated petroleum resin, an alicyclic petroleum resin, an alicyclic hydrogenated petroleum resin, a copolymer-based hydrogenated petroleum resin, and the like. Among those, it is preferable to use either the aromatic hydrogenated petroleum resin or the alicyclic hydrogenated petroleum resin. In particular, a tackifier resin containing at least one resin selected from the group consisting of the aliphatic petroleum resin, the aromatic petroleum resin, the alicyclic hydrogenated petroleum resin and the copolymer-based petroleum resin is preferable because such a tackifier resin is excellent in sealability and adhesiveness.

The tackifier resin (B) included in the present invention preferably has a softening point which is measured by a ring-and-ball method and falls within a range of 90° C. or more and 140° C. or less, more preferably 100° C. or more and 135° C. or less, further preferably 105° C. or more and 130° C. or less. In a case where the softening point falls within the above range, blocking of the film after molding is reduced, and adhesion strength retention under a low temperature environment is suitable.

As the tackifier resin (B) included in the present invention, it is possible to use a commercially available tackifier resin. Specifically, examples of the petroleum resin-based tackifier resin include (product name:) ARKON P100, ARKON P125, ARKON P140, ARKON M90, ARKON M115, ARKON M135 (which are available from Arakawa Chemical Industries, Ltd.), I-MARV 5110, I-MARV P125 (which are available from Idemitsu Kosan Co., Ltd.), T-REZ RC115, T-REZ HA125 (which are available from JXTG Nippon Oil & Energy Corporation), and the like. Examples of the rosin-based resin include PINECRYSTAL KE-311 (available from Arakawa Chemical Industries, Ltd.) Examples of the terpene-based resin include YS Resin PX1150, YS Resin PX1150N (which are available from Yasuhara Chemical Co., Ltd.) and the like.

A mixing ratio of the ethylene-vinyl acetate copolymer (A) and the tackifier resin (B) included in the present invention is as follows. Here, a total amount of (A) and (B) is 100 parts by weight.

A mixing ratio of the ethylene-vinyl acetate copolymer (A) included in the present invention is not less than 60 parts by weight and not more than 95 parts by weight, preferably not less than 70 parts by weight and not more than 90 parts by weight, more preferably not less than 75 parts by weight and not more than 90 parts by weight. If the mixing ratio of (A) is less than 60 parts by weight, such a mixing ratio is not preferable because molding process stability of an obtained resin composition is deteriorated. Meanwhile, if the mixing ratio exceeds 95 parts by weight, such a mixing ratio is not preferable because sealability and adhesiveness of an obtained resin composition become insufficient. The mixing ratio of (A) is preferably not less than 81 parts by weight and not more than 90 parts by weight. With the mixing ratio, even if the mixing amount of the tackifier (B) is reduced, the resin composition in accordance with an aspect of the present invention can maintain satisfactory adhesion strength and sealing strength.

The mixing ratio of the tackifier resin (B) included in the present invention is not less than 5 parts by weight and not more than 40 parts by weight, preferably not less than 10 parts by weight and not more than 30 parts by weight, more preferably not less than 10 parts by weight and not more than 25 parts by weight. If the mixing ratio of (B) is less than 5 parts by weight, such a mixing ratio is not preferable because sealability and adhesiveness of an obtained resin composition become insufficient. Meanwhile, if the mixing ratio exceeds 40 parts by weight, such a mixing ratio is not preferable because, when the resin is formed into a film shape, blocking between films becomes strong, which may adversely affect secondary processing, and sealability is lowered. The mixing ratio of (B) is preferably not less than 10 parts by weight and not more than 19 parts by weight. With the mixing ratio, even if the mixing amount of the tackifier (B) is reduced, the resin composition in accordance with an aspect of the present invention can maintain satisfactory adhesion strength and sealing strength.

That is, in the resin composition in accordance with an aspect of the present invention, it is preferable that the mixing ratio of (A) is not less than 81 parts by weight and not more than 90 parts by weight, and the mixing ratio of (B) is not less than 10 parts by weight and not more than 19 parts by weight (where the total amount of (A) and (B) is 100 parts by weight).

The resin composition in accordance with an aspect of the present invention can be mixed with a thermoplastic block copolymer (C) containing at least one of olefin and diolefin as a constitutional unit and containing aromatic vinyl hydrocarbon as a constitutional unit. The thermoplastic block copolymer (C) is represented by the following formula:

(A-B)$n$ (A-B)$n$-A' or (A-B)$m$-X (where each of A and A' independently represents an aromatic vinyl hydrocarbon polymer block; B represents a polymer block of either olefin or diolefin; n represents an integer of 1 to 5, m represents an integer of 2 to 7, and X represents an m-valent polyfunctional compound)

The thermoplastic block copolymer (C) has at least one structure selected from the group consisting of a linear chain structure, a radial structure and a branched structure, and has a block structure in which at least one terminal is an aromatic vinyl hydrocarbon polymer block. The thermoplastic block copolymer (c) can be a hydrogenated product thereof.

Examples of the aromatic vinyl hydrocarbon used herein include styrene, α-methylstyrene, vinyltoluene, p-tert-butylstyrene, vinylxylene, ethylvinyl xylene, vinyl naphthalene, and mixtures thereof. Among those, styrene is particularly preferable.

Examples of the olefin used include α-olefin such as ethylene, propylene, and 1-butene, and examples of diolefin include conjugated diolefin such as butadiene and isoprene.

As the thermoplastic block copolymer (C), it is preferable to use a copolymer of either olefin or conjugated diolefin and aromatic vinyl hydrocarbon, and it is further preferable to use a polymer block which is obtained by polymerizing conjugated diolefin and which is hydrogenated, provided that a block B is dominated by olefin units. In the present invention, a thermoplastic block copolymer is preferable which is of aromatic vinyl hydrocarbon and olefin or diolefin and which has aromatic vinyl hydrocarbon polymer blocks at both ends. In particular, a hydrogenated product of a polystyrene-polybutadiene-polystyrene block copolymer (styrene-ethylene/butylene-styrene triblock copolymer, hereinafter referred to as "hydrogenated SEBS") can be particularly preferably used from the viewpoint of improving heat stability.

The thermoplastic block copolymer (C) contained in the resin composition in accordance with an aspect of the present invention can be a composition composed of a single copolymer or a composition containing at least two or more kinds of copolymers. It is preferable that the thermoplastic block copolymer (C) is a compositional mixture of a hydrogenated styrene-butadiene-diblock copolymer and a hydrogenated styrene-butadiene-styrene-triblock copolymer, and a mixing ratio thereof is preferably 5/5 to 9/1 in terms of diblock body/triblock body, in order to obtain an adhesive agent for a sealant which is particularly excellent in molding processability and adhesion strength. In addition, a styrene content in the mixture is preferably not less than 10% by weight and not more than 50% by weight relative to a total amount of the thermoplastic block copolymer (C).

The styrene content can be measured, for example, as follows: an infrared absorption spectrum of a reference sample whose styrene content is known is measured; a calibration curve is prepared using absorbance derived from a benzene ring around 700 cm$^{-1}$; and then the styrene content is obtained from absorbance derived from a benzene ring of a sample whose styrene content is unknown.

The mixing ratio of the thermoplastic block copolymer (C) which is of aromatic vinyl hydrocarbon and olefin or diolefin and which is included in the present invention is preferably not less than 0.5 parts by weight and not more than 5 parts by weight, more preferably not less than 1 part by weight and not more than 5 parts by weight, further preferably not less than 2 parts by weight and not more than 4 parts by weight, relative to 100 parts by weight of the mixture of the ethylene-vinyl acetate copolymer (A) and the tackifier resin (B).

The thermoplastic block copolymer (C) which is of aromatic vinyl hydrocarbon and olefin or diolefin and which is included in the present invention can be a commercially available one. Specific examples include (product name:) Kraton G1726VS, Kraton G1657VS, Kraton G1730VS (which are available from Clayton Polymers Japan Ltd.) and the like.

The resin composition in accordance with an aspect of the present invention can contain ethylene-α-olefin copolymer (D). As the ethylene-α-olefin copolymer (D), it is possible to use any copolymer which belongs to the category generally referred to as an ethylene-α-olefin copolymer. Examples of α-olefin include, but not limited to, propene having 3 to 12 carbon atoms, 1-butene, 1-pentene, 1-hexene, 4-methyl-1-pentene, 1-octene, 1-decene, 1-dodecane, and the like. Those ethylene-α-olefin copolymers (D) can be suitably produced by copolymerizing ethylene and α-olefin using a Ziegler-based catalyst or a chromium-based catalyst or a metallocene catalyst. Examples of the polymerization method include a solution polymerization method, a high pressure polymerization method, and a vapor phase polymerization method.

It is preferable that the ethylene-α-olefin copolymer (D) included in the present invention has a density that is measured based on JIS K6922-1 (1998) and falls within a range of 860 kg/m$^3$ or more and 910 kg/m$^3$ or less in order to achieve excellent low-temperature sealability and sealing strength.

The mixing ratio of the ethylene-α-olefin copolymer (D) which is included in the present invention is preferably not less than 5 parts by weight and not more than 100 parts by weight, more preferably not less than 10 parts by weight and not more than 50 parts by weight, further preferably not less than 18 parts by weight and not more than 40 parts by weight, relative to 100 parts by weight of the mixture of the ethylene-vinyl acetate copolymer (A) and the tackifier resin (B).

The resin composition in accordance with an aspect of the present invention can contain low density polyethylene (E).

It is preferable that the low density polyethylene (E) contained in the resin composition in accordance with an aspect of the present invention is obtained by polymerizing only ethylene using a known high pressure polymerization method, and a range of density measured based on JIS K 6922-1 is 910 kg/m$^3$ or more and 940 kg/m$^3$ or less. A number-average molecular weight (Mn) of the low density polyethylene (E) is preferably in the range of 500 to 18000, more preferably 1000 to 15000, further preferably 1000 to 13000. In addition, a melting point of the low density polyethylene (E) is preferably in a range of 98° C. or more and 120° C. or less, more preferably in a range of 100° C. or more and 110° C. or less.

The mixing ratio of the low density polyethylene (E) which is included in the present invention is preferably not less than 1 part by weight and not more than 50 parts by weight, more preferably not less than 5 parts by weight and not more than 30 parts by weight, further preferably not less than 8 parts by weight and not more than 25 parts by weight, relative to 100 parts by weight of the mixture of the ethylene-vinyl acetate copolymer (A) and the tackifier resin (B).

As the low density polyethylene (E) included in the present invention, it is possible to use a commercially available one. Specific examples include (product name:) SANWAX (available from Sanyo Chemical Industrial Co., Ltd.), Hi-WAX (available from Mitsui Chemicals, Inc) and the like.

The resin composition in accordance with an aspect of the present invention can contain a saponified ethylene-vinyl acetate copolymer (F).

The saponified ethylene-vinyl acetate copolymer (F) included in the present invention is obtained by a known production method. For example, the saponified ethylene-vinyl acetate copolymer (F) can be produced by alkali-catalyzed or acid-catalyzed hydrolysis of an ethylene-vinyl acetate copolymer. Examples of specific production method include: a homogeneous saponification method in which an ethylene-vinyl acetate copolymer as a raw material is dissolved in a good solvent and is caused to react in a homogeneous system; and a heterogeneous saponification method in which a reaction is carried out in a heterogeneous system in the form of pellets or powder in a poor solvent such as methanol or ethanol. In this case, the ethylene-vinyl acetate copolymer can be produced by a known method, for example, a high pressure method, an emulsification method, or the like, or can be a commercially available product.

A melting point of the ethylene-vinyl alcohol copolymer (F) included in the present invention measured based on JIS K 6924-2 is preferably 90° C. or more and 120° C. or less, more preferably 100° C. or more and 115° C. or less.

The saponified ethylene-vinyl acetate copolymer (F) included in the present invention can contain vinyl acetate in a molecular structure. A vinyl acetate content is preferably not more than 40% by weight, more preferably not more than 25% by weight. In the saponified product, when a saponification ratio is 100%, vinyl acetate is not contained, so that the vinyl acetate content is 0%. That is, the vinyl acetate content is 0% or more.

The vinyl alcohol content of the saponified ethylene-vinyl acetate copolymer (F) included in the present invention is preferably not less than 1.2% by weight and not more than 50% by weight, more preferably not less than 3% by weight and not more than 20% by weight. It is preferable that the vinyl alcohol content is greater than the vinyl acetate content.

The mixing ratio of the saponified ethylene-vinyl acetate copolymer (F) which is included in the present invention is preferably not less than 1 part by weight and not more than 100 parts by weight, more preferably not less than 5 parts by weight and not more than 30 parts by weight, further preferably not less than 8 parts by weight and not more than 20 parts by weight, relative to 100 parts by weight of the mixture of the ethylene-vinyl acetate copolymer (A) and the tackifier resin (B), in order to achieve excellent low-temperature sealability and heat sealing strength.

As the saponified ethylene-vinyl acetate copolymer (F) included in the present invention, it is possible to use a commercially available one. Specific examples include (product name:) Mersen H (available from Tosoh Corporation) and the like.

It is possible that the resin composition in accordance with an aspect of the present invention contains the ethylene-vinyl acetate copolymer (A) and the tackifier resin (B) and further contains: a thermoplastic block copolymer (C) in an amount of not less than 0.5 parts by weight and not more than 5 parts by weight relative to 100 parts by weight of (A) and (B), the thermoplastic block copolymer (C) containing at least one of olefin and diolefin as a constitutional unit and containing aromatic vinyl hydrocarbon as a constitutional unit; and an ethylene-α-olefin copolymer (D) in an amount of not less than 5 parts by weight and not more than 100 parts by weight relative to 100 parts by weight of (A) and (B), the ethylene-α-olefin copolymer (D) having a density that is measured based on JIS K6922-1 (1998) and falls within a range of 860 kg/m$^3$ or more and 910 kg/m$^3$ or less.

It is possible that the resin composition in accordance with an aspect of the present invention contains the ethylene-vinyl acetate copolymer (A) and the tackifier resin (B) and further contains: a thermoplastic block copolymer (C) in an amount of not less than 0.5 parts by weight and not more than 5 parts by weight relative to 100 parts by weight of (A) and (B), the thermoplastic block copolymer (C) containing at least one of olefin and diolefin as a constitutional unit and containing aromatic vinyl hydrocarbon as a constitutional unit; and low density polyethylene (E) in an amount of not less than 1 part by weight and not more than 50 parts by weight relative to 100 parts by weight of (A) and (B), the low density polyethylene (E) having a number-average molecular weight that falls within a range of 500 to 18000, and having a melting point that falls within a range of 98° C. or more and 120° C. or less.

It is possible that the resin composition in accordance with an aspect of the present invention contains the ethylene-vinyl acetate copolymer (A) and the tackifier resin (B) and further contains: a thermoplastic block copolymer (C) in an amount of not less than 0.5 parts by weight and not more than 5 parts by weight relative to 100 parts by weight of (A) and (B), the thermoplastic block copolymer (C) containing at least one of olefin and diolefin as a constitutional unit and containing aromatic vinyl hydrocarbon as a constitutional unit; and a saponified ethylene-vinyl acetate copolymer (F) in an amount of not less than 1 part by weight and not more than 100 parts by weight relative to 100 parts by weight of (A) and (B), the saponified ethylene-vinyl acetate copolymer (F) having a melting point that is measured based on JIS K6924-2 and is 90° C. or more and 120° C. or less.

The resin composition in accordance with an aspect of the present invention can contain another thermoplastic resin or rubber, a light stabilizer, a UV absorbent, a nucleating agent, a lubricant, an antioxidant, an antiblocking agent, a flow improver, a mold release agent, a flame retardant, a colorant, an inorganic neutralizing agent, a hydrochloric acid absorbent, a filler conductive agent, and/or the like, to the extent that the effect of the present invention is not impaired.

There is no particular limitation on a method for preparing the resin composition in accordance with an aspect of the present invention. Examples of the method include a method in which the ethylene-vinyl acetate copolymer (A), the tackifier resin (B) and a material to be mixed therewith are simultaneously pre-blended by a mixer such as a Henschel mixer or a tumbler, and then melt-kneaded by a single or double screw extruder.

The following description will discuss details of an adhesive agent for a sealant which is one aspect of the present invention.

The resin composition in accordance with an aspect of the present invention can be used as an adhesive agent. In particular, the resin composition can be suitably used as an adhesive agent for a sealant of a plastic container containing, as a main component, a resin containing polyethylene terephthalate, polystyrene, polypropylene, or the like or various other resins, in particular, as an adhesive agent for a lid material sealant. Here, the term "sealant" means a sealant used for sealing a container. By using the adhesive agent for a lid material sealant in accordance with an aspect of the present invention, it is possible to seal a lid material and a container.

Specific examples of a material of a plastic container include a polyolefin-based resin, an acrylic acid-based resin, a polyamide-based resin, a polyester-based resin, a polycarbonate resin, a polystyrene resin, a styrene-acrylonitrile copolymer, a polyvinyl chloride resin, and the like.

Examples of the polyolefin-based resin include low density polyethylene, high density polyethylene, an ethylene-α-olefin copolymer, an ethylene-vinyl acetate copolymer, polypropylene, and the like.

Examples of the acrylic acid-based resin include poly(acrylic acid), poly(methyl acrylate), poly(ethyl acrylate), poly(butyl acrylate), poly(octyl acrylate), poly(methacrylic acid), poly(methyl methacrylate), poly(ethyl methacrylate), poly(butyl methacrylate), and poly(octyl methacrylate), and the like.

Examples of the polyamide-based resin include nylon 6, nylon 6,6, nylon 11, nylon 12, and the like.

Examples of the polyester resin includes polyethylene terephthalate, polybutylene terephthalate, polylactic acid (including poly-L-lactic acid, poly-D-lactic acid, copolymer of L-lactic acid and D-lactic acid, stereocomplex of poly-L-lactic acid and poly-D-lactic acid), polybutylene succinate, poly(butylene succinate/adipate), polyethylene succinate, poly(butylene succinate/terephthalate), poly(butylene adipate/terephthalate), poly(hydroxybutyrate/hydroxyhexanoate), polyglycolic acid, poly(3-hydroxybutyrate), polycaprolactone, and the like.

In a case where the resin composition in accordance with an aspect of the present invention is used as an adhesive agent for adhesion of a plastic container containing those materials, a main component of the plastic container can be a single component or can be a composition of a plurality of resins. The container can be a multilayer laminate in which a plurality of materials are laminated.

The resin composition in accordance with an aspect of the present invention can be suitably used especially in containers made of polyethylene terephthalate, polylactic acid, polystyrene, and/or polypropylene.

The following description will discuss details of a film for a lid material which is one aspect of the present invention.

In a case where the resin composition in accordance with an aspect of the present invention is used as an adhesive agent, the resin composition is preferably used as an adhesive layer containing a composition (hereinafter referred to as "sealant adhesive layer"). Further, the resin composition in accordance with an aspect of the present invention can be suitably used as a film for a lid material which includes at least two layers (i.e., a supportive base layer and the sealant adhesive layer) and in which the sealant adhesive layer serves as an outermost layer.

There is no particular limitation on a supportive substrate constituting the supportive base layer as long as the supportive substrate has self-supporting property. Examples of the supportive substrate include: a plastic film composed of a thermoplastic resin such as an olefin-based resin such as polyethylene, polypropylene, an ethylene-α-olefin copolymer, an ethylene-vinyl acetate copolymer, and a saponified ethylene-vinyl acetate copolymer, polyester-based resin such as polyethylene terephthalate, polybutylene terephthalate, polylactic acid (including poly-L-lactic acid, poly-D-lactic acid, copolymer of L-lactic acid and D-lactic acid, stereocomplex of poly-L-lactic acid and poly-D-lactic acid), polybutylene succinate, poly(butylene succinate/adipate), polyethylene succinate, poly(butylene succinate/terephthalate), poly(butylene adipate/terephthalate), poly(hydroxybutyrate/hydroxyhexanoate), polyglycolic acid, poly(3-hydroxybutyrate), and polycaprolactone, and a polyamide-based resin such as nylon 6, nylon 6,6, nylon 11, and nylon 12; paper such as Japanese paper and composite paper; a metal foil composed of metal such as aluminum; a vapor deposition film formed by vapor deposition of aluminum, silica, or the like onto a surface of a polyester-based resin film or the like; and a supportive substrate composed of any one of these materials alone or composed of a laminate of these materials. A thickness of the supportive base layer can be selected in accordance with the application within a range in which mechanical strength, workability, and the like are not impaired. The thickness is typically approximately 5 μm to 100 μm, preferably 10 μm to 50 μm.

In a case where the sealant adhesive layer is used as a film for a lid material, a thickness of the sealant adhesive layer can be selected in accordance with the application within a range in which adhesiveness, workability, and the like are not impaired. The thickness is typically approximately 5 μm to 50 μm, preferably 10 μm to 40 μm, further preferably 15 μm to 30 μm.

According to the present invention, it is also possible to provide an intermediate layer between the supportive base layer and the sealant adhesive layer in order to enhance adhesion between both layers. This intermediate layer can be composed of components such as a thermoplastic resin such as polyolefin, and/or a thermoplastic elastomer, and those components can be used alone or as a mixture of two or more thereof. Examples of the polyolefin include polyethylene and ethylene copolymers (ethylene-α-olefin copolymer, propylene-ethylen copolymer, ethylene-acrylic acid copolymer, ethylene-methacrylic acid copolymer, ethylene-methyl acrylate copolymer, and the like) and modified products thereof. Various additives such as an antioxidant, a lubricant, an antistatic agent, an electrically conductive agent, an antiblocking agent, a tackifier, and the like can be contained in the intermediate layer within a range in which the effect of the present invention is not impaired.

A thickness of the intermediate layer can be selected in accordance with the application within a range in which workability and the like are not impaired. The thickness is typically approximately 5 μm to 30 μm.

According to the present invention, an anchor coating layer such as of polyurethane can be provided between the supportive base layer and the sealant adhesive layer or between the supportive base layer and the intermediate layer in order to enhance adhesion between both layers.

The film for a lid material which includes the sealant adhesive layer in accordance with an aspect of the present invention as the outermost layer is suitable as a lid material for various types of plastic containers such as of A-PET, and has high sealing strength and easy releasability.

There is no particular limitation on a method for producing the film for a lid material. Examples of the method include a method of laminating an adhesive agent for a sealant and a supportive base layer, and a method of coextruding an adhesive agent for a sealant and a supportive base layer.

Examples of the laminating method include: (1) an extrusion lamination method in which an anchor coating agent is applied to a supportive base layer and an adhesive layer is melt-extruded; (2) an extrusion lamination method in which an anchor coating agent is applied to a supportive base layer and an intermediate layer is melt-extruded, and then a sealant adhesive layer is melt-extruded thereon; (3) an extrusion lamination method in which an intermediate layer which is excellent in adhesiveness with a supportive substrate such as an ethylene-methacrylic acid copolymer or an ethylene-methyl methacrylate copolymer is melt-extruded onto a supportive base layer and then a sealant adhesive layer is melt-extruded thereon; (4) a coextrusion lamination method in which an anchor coating agent is applied to a supportive base layer and an intermediate layer and an adhesive layer are simultaneously melt-extruded; (5) a coextrusion lamination method in which an intermediate layer which is excellent in adhesiveness with a supportive substrate such as an ethylene-methacrylic acid copolymer or an ethylene-methyl methacrylate copolymer and a sealant adhesive layer are simultaneously melt-extruded onto a supportive base layer; (6) a dry lamination method in which a film including at least one layer of sealant adhesive agent is formed in advance by inflation molding or cast molding, and the film is bonded to a supportive base layer coated with an anchor coating agent; (7) a sandwiching extrusion lamination method in which an intermediate layer is laminated by melt extrusion using extrusion lamination between a supportive base layer coated with an anchor coating agent and a film including at least one layer of sealant adhesive agent; and the like. Meanwhile, examples of the method of coextruding an adhesive agent for a sealant and a supportive base layer include a coextrusion inflation method, a coextrusion T-die method, and the like.

EXAMPLES

The following description will discuss the present invention in further detail with reference to Examples. Note, however, that the present invention is not limited to those Examples.

(Measurement of Molecular Weight of Ethylene-Vinyl Acetate Copolymer (A))

A weight-average molecular weight (Mw) and a number-average molecular weight (Mn) of the ethylene-vinyl acetate copolymer (A) were calculated as molecular weights of linear polyethylene by measuring a universal calibration curve by gel permeation chromatography using monodisperse polystyrene under the following conditions.

Model: 150C ALC/GPC available from Waters Corporation
   Solvent: 1,2,4-trichlorobenzene
   Flow rate: 1 ml/min
   Temperature: 140° C.
   Measurement concentration: 30 mg/30 ml
   Injection volume: 100 µl
   Column: TSKgel GMH HR-H (3 columns) available from Tosoh Corporation
   Ratios between Mw and Mn are shown in Table 5.

For the films for a lid material obtained in Examples, sealing strength and adhesion strength were measured by the following methods.

(Measurement of Sealing Strength)

An adhesive agent surface of the film for a lid material was put onto an amorphous polyethylene terephthalate (A-PET) cup (aperture diameter: 65 mm, flange width: 2 mm, capacity: 215 ml), and the film was bonded to the cup by applying pressure and heat using a cup sealing machine (available from Sunny Cup, Model: UF-500) under conditions of 160° C., 40 Kgf/cup, and 1 second. After cooling, bursting strength was measured by using a seal tester (available from Sun Scientific Co., Ltd., Model: FKT-100J) under a condition of air-injection volume of 0.8 L/min. Strength obtained here is defined as sealing strength.

(Measurement of Adhesion Strength)

Adhesion strength was measured in conformity to the method described in JIS Z0238. An adhesive agent surface of the film for a lid material was put onto an A-PET sheet having a thickness of 0.35 mm (available from Mineron Kasei Co., Ltd.), and the film was bonded to the sheet by applying pressure and heat with a sealing bar having a width of 20 mm using a heat sealing tester (available from Tester Sangyo Co., Ltd., TP-701 type) under conditions of 170° C., 0.2 MPa, and time of 1 second. After cooling, a test piece was cut out perpendicularly to the width direction of the adhesive surface so as to have a strip shape with a width of 15 mm. Tensile strength of the test piece was measured using a tensile tester (available from A&D Company, Limited, RTE-1210) under conditions of peeling angle: 180 degrees, peeling rate: 300 mm/min, chuck-to-chuck distance: 40 mm. A measured value at a point where the tensile strength has become stable is defined as adhesion strength.

Example 1

As the ethylene-vinyl acetate copolymer (A), 85 parts by weight of a resin (A-1) having a vinyl acetate content of 5.0%, a melt mass flow rate of 1.0 g/10 min, a ratio Qw between a weight-average molecular weight (Mw) and a number-average molecular weight (Mn) of 3.8 was preliminarily blended with, as the tackifier resin (B), 15 parts by weight of a fully hydrogenated petroleum resin (B-1) (available from Arakawa Chemical Industries, Ltd., product name: ARKON P125; softening temperature: 125° C.) in a tumbler mixer, and then a resultant mixture was melt-kneaded at 180° C. with use of a twin-screw extruder to obtain pellets of a resin composition. Note that, to the resin composition, 0.05 parts by weight of a phenolic antioxidant (available from BASF, product name: Irganox 1010) and 0.2 parts by weight of a slipping agent (available from LION AKZO Co., Ltd., product name: Armo Wax E) were added relative to 100 parts by weight of an adhesive agent for a sealant, while taking into consideration heat stability.

Then, extrusion lamination of the resin composition pellets on a surface of low density polyethylene bilayer film (obtained in advance by extrusion lamination of low density polyethylene (thickness of 25 µm, available from Tosoh Corporation, product name: Petrosen 203) which is an intermediate layer onto a biaxial-oriented polyester film (having thickness of 12 µm) which is a supportive base layer) was carried out at a processing temperature of 230° C. with use of an extrusion laminator (available from Placo Co., Ltd., screw diameter: 25 mmφ) to obtain a film for a lid material including the resin composition layer having a thickness of 15 µm.

Table 1 indicates results of evaluation of the obtained resin composition and film for a lid material.

Example 2

A resin composition and a film for a lid material were obtained in a manner similar to that of Example 1, except that, to the resin composition of Example 1 containing the ethylene-vinyl acetate copolymer (A-1) and the tackifying resin (B-1), 3 parts by weight of a thermoplastic block copolymer (C-1) (Kraton G1726VS) of aromatic vinyl hydrocarbon and diolefin in which a mixing ratio of hydrogenated styrene-butadiene-diblock copolymer/hydrogenated styrene-butadiene-styrene-triblock copolymer was 7/3 and a styrene content was 30% by weight was further added as the thermoplastic block copolymer (C).

Table 1 indicates results of evaluation of the obtained resin composition and film for a lid material.

Example 3

A resin composition and a film for a lid material were obtained in a manner similar to that of Example 1, except that 85 parts by weight of a resin (A-2) having a vinyl acetate content of 7.5%, a melt mass flow rate of 2.0 g/10 min, and a ratio Qw between a weight-average molecular weight (Mw) and a number-average molecular weight (Mn) of 4.2 was mixed instead of 85 parts by weight of the ethylene-vinyl acetate copolymer (A-1).

Table 1 indicates results of evaluation of the obtained resin composition and film for a lid material.

Example 4

A resin composition and a film for a lid material were obtained in a manner similar to that of Example 2, except that 85 parts by weight of a resin (A-2) having a vinyl acetate content of 7.5%, a melt mass flow rate of 2.0 g/10 min, and a ratio Qw between a weight-average molecular weight (Mw) and a number-average molecular weight (Mn) of 4.2 was mixed instead of 85 parts by weight of the ethylene-vinyl acetate copolymer (A-1).

Table 1 indicates results of evaluation of the obtained resin composition and film for a lid material.

Example 5

A resin composition and a film for a lid material were obtained in a manner similar to that of Example 1, except that 20 parts by weight of an ethylene-α-olefin copolymer (D-1) (available from Mitsui Chemicals, Inc., product name: TAFMER P-0375) having a density of 860 kg/m$^3$ was mixed as the ethylene-α-olefin copolymer (D) with the resin composition of Example 2.

Table 1 indicates results of evaluation of the obtained resin composition and film for a lid material.

Example 6

A resin composition and a film for a lid material were obtained in a manner similar to that of Example 1, except that 10 parts by weight of low density polyethylene (E-1) (available from Sanyo Chemical Industrial Co., Ltd., product name: SANWAX 151P) having a number-average molecular weight (Mn) of 2000 and a melting point of 107° C. was mixed as the low density polyethylene (E) with the resin composition of Example 2.

Table 1 indicates results of evaluation of the obtained adhesive agent for a sealant and film for a lid material.

Example 7

A resin composition and a film for a lid material were obtained in a manner similar to that of Example 1, except that 10 parts by weight of a saponified ethylene-vinyl acetate copolymer (F-1) (available from Tosoh Corporation, product name: Mersen H6051) having a melting point of 107° C. and a melt mass flow rate of 5.5 g/10 min was mixed as the saponified ethylene-vinyl acetate copolymer (F) with the resin composition of Example 2.

Table 1 indicates results of evaluation of the obtained resin composition and film for a lid material.

Comparative Example 1

A resin composition and a film for a lid material were obtained in a manner similar to that of Example 1, except that 85 parts by weight of a resin (A-3) (available from Tosoh Corporation, product name: Ultrasen 520F) having a vinyl acetate content of 7.5%, a melt mass flow rate of 2.0 g/10 min, and a ratio Qw between a weight-average molecular weight (Mw) and a number-average molecular weight (Mn) of 6.4 was mixed instead of 85 parts by weight of the ethylene-vinyl acetate copolymer (A-1).

Table 2 indicates results of evaluation of the obtained resin composition and film for a lid material. The obtained film for a lid material was inferior in adhesion strength and sealing strength.

Comparative Example 2

A resin composition and a film for a lid material were obtained in a manner similar to that of Example 1, except that 85 parts by weight of a resin (A-4) (available from Tosoh Corporation, product name: Ultrasen 540) having a vinyl acetate content of 10%, a melt mass flow rate of 3.0 g/10 min, and a ratio Qw between a weight-average molecular weight (Mw) and a number-average molecular weight (Mn) of 6.1 was mixed instead of 85 parts by weight of the ethylene-vinyl acetate copolymer (A-1).

Table 2 indicates results of evaluation of the obtained resin composition and film for a lid material. The obtained film for a lid material was inferior in adhesion strength and sealing strength.

Comparative Example 3

A resin composition and a film for a lid material were obtained in a manner similar to that of Example 1, except that a mixing ratio of the ethylene-vinyl acetate copolymer (A-1) was changed to 50 parts by weight, and a mixing ratio of the tackifier resin (B-1) was changed to 50 parts by weight.

Table 2 indicates results of evaluation of the obtained resin composition and film for a lid material. The obtained film for a lid material was inferior in sealing strength.

Comparative Example 4

An adhesive agent for a sealant and a film for a lid material were obtained in a manner similar to that of Example 1, except that a mixing ratio of the ethylene-vinyl acetate copolymer (A-1) was changed to 97 parts by weight, and a mixing ratio of the tackifier resin (B-1) was changed to 3 parts by weight.

Table 2 indicates results of evaluation of the obtained adhesive agent for a sealant and film for a lid material. The obtained film for a lid material was inferior in adhesion strength and sealing strength.

Comparative Example 5

A resin composition and a film for a lid material were obtained in a manner similar to that of Example 1, except that 85 parts by weight of an ethylene-vinyl acetate copolymer (A-5) (available from Tosoh Corporation, product name: Ultrasen 537) having a vinyl acetate content of 5.5%, a melt mass flow rate of 8.5 g/10 min, and a ratio Qw between a weight-average molecular weight (Mw) and a number-average molecular weight (Mn) of 5.8 was mixed instead of 85 parts by weight of the ethylene-vinyl acetate copolymer (A-1).

Table 3 indicates results of evaluation of the obtained resin composition and film for a lid material. The obtained film for a lid material was inferior in adhesion strength and sealing strength.

Comparative Example 6

A resin composition and a film for a lid material were obtained in a manner similar to that of Example 1, except that 85 parts by weight of an ethylene-vinyl acetate copolymer (A-6) (available from Tosoh Corporation, product name: Ultrasen 626) having a vinyl acetate content of 15%, a melt mass flow rate of 3.0 g/10 min, and a ratio Qw between a weight-average molecular weight (Mw) and a number-average molecular weight (Mn) of 4.7 was mixed instead of 85 parts by weight of the ethylene-vinyl acetate copolymer (A-1).

Table 3 indicates results of evaluation of the obtained resin composition and film for a lid material. The obtained film for a lid material was inferior in adhesion strength and sealing strength.

Comparative Example 7

A resin composition and a film for a lid material were obtained in a manner similar to that of Example 1, except that 85 parts by weight of an ethylene-vinyl acetate copolymer (A-7) (available from Tosoh Corporation, product name: Ultrasen 541) having a vinyl acetate content of 10%, a melt mass flow rate of 9.0 g/10 min, and a ratio Qw between a weight-average molecular weight (Mw) and a number-average molecular weight (Mn) of 5.4 was mixed instead of 85 parts by weight of the ethylene-vinyl acetate copolymer (A-1).

Table 3 indicates results of evaluation of the obtained resin composition and film for a lid material. The obtained film for a lid material was inferior in adhesion strength and sealing strength.

Comparative Example 8

A resin composition and a film for a lid material were obtained in a manner similar to that of Example 1, except that 85 parts by weight of an ethylene-vinyl acetate copolymer (A-8) (available from Tosoh Corporation, product name: Ultrasen 633) having a vinyl acetate content of 20%, a melt mass flow rate of 20 g/10 min, and a ratio Qw between a weight-average molecular weight (Mw) and a number-average molecular weight (Mn) of 3.5 was mixed instead of 85 parts by weight of the ethylene-vinyl acetate copolymer (A-1).

Table 3 indicates results of evaluation of the obtained resin composition and film for a lid material. The obtained film for a lid material was inferior in adhesion strength and sealing strength.

Comparative Example 9

A resin composition and a film for a lid material were obtained in a manner similar to that of Example 1, except that 85 parts by weight of an ethylene-vinyl acetate copolymer (A-9) (available from Tosoh Corporation, product name: Ultrasen 625) having a vinyl acetate content of 15%, a melt mass flow rate of 14 g/10 min, and a ratio Qw between a weight-average molecular weight (Mw) and a number-average molecular weight (Mn) of 4.3 was mixed instead of 85 parts by weight of the ethylene-vinyl acetate copolymer (A-1).

Table 3 indicates results of evaluation of the obtained resin composition and film for a lid material.

Comparative Example 10

A resin composition and a film for a lid material were obtained in a manner similar to that of Example 1, except that 42.5 parts by weight of the ethylene-vinyl acetate copolymer (A-5) and 42.5 parts by weight of the ethylene-vinyl acetate copolymer (A-6) were mixed instead of 85 parts by weight of the ethylene-vinyl acetate copolymer (A-1).

Table 3 indicates results of evaluation of the obtained resin composition and film for a lid material. The obtained film for a lid material was inferior in adhesion strength and sealing strength.

Comparative Example 11

A resin composition and a film for a lid material were obtained in a manner similar to that of Comparative Example 10, except that 3 parts by weight of the thermoplastic block copolymer (C-1) was mixed with the resin composition of Comparative Example 10.

Table 3 indicates results of evaluation of the obtained resin composition and film for a lid material. The obtained film for a lid material was inferior in adhesion strength and sealing strength.

Comparative Example 12

A resin composition and a film for a lid material were obtained in a manner similar to that of Comparative Example 10, except that 3 parts by weight of the thermoplastic block copolymer (C-1) and 20 parts by weight of the ethylene-α-olefin copolymer (D-1) were mixed with the resin composition of Comparative Example 10.

Table 3 indicates results of evaluation of the obtained resin composition and film for a lid material. The obtained film for a lid material was inferior in adhesion strength.

Example 8

Sealing strength of the film for a lid material obtained in the process of Example 1 was measured with a method similar to that described in (Measurement of sealing strength), except that a cup made of polystyrene (PS) (aperture diameter: 65 mm, flange width: 2 mm, capacity: 215 ml) was used instead of the A-PET cup. Moreover, adhesion strength was measured with a method similar to that described in (Measurement of adhesion strength), except that a PS sheet (thickness: 0.4 mm) was used instead of the A-PET sheet.

Table 4 indicates results of evaluation of the film for a lid material.

Example 9

Sealing strength and adhesion strength of the film for a lid material obtained in the process of Example 2 were measured with methods similar to those in Example 8.

Table 4 indicates results of evaluation of the film for a lid material.

Example 10

Sealing strength of the film for a lid material obtained in the process of Example 1 was measured with a method similar to that described in (Measurement of sealing strength), except that a cup made of polypropylene (PP) (aperture diameter: 65 mm, flange width: 2 mm, capacity: 215 ml) was used instead of the A-PET cup. Moreover, adhesion strength was measured with a method similar to that described in (Measurement of adhesion strength), except that a PP sheet (thickness: 0.3 mm) was used instead of the A-PET sheet.

Table 4 indicates results of evaluation of the film for a lid material.

Example 11

Sealing strength and adhesion strength of the film for a lid material obtained in the process of Example 2 were measured with methods similar to those in Example 10.

Table 4 indicates results of evaluation of the film for a lid material.

Example 12

Sealing strength of the film for a lid material obtained in the process of Example 1 was measured with a method similar to that described in (Measurement of sealing strength), except that a cup made of polylactic acid (PLA) (aperture diameter: 65 mm, flange width: 2 mm, capacity: 215 ml) was used instead of the A-PET cup. Moreover, adhesion strength was measured with a method similar to that described in (Measurement of adhesion strength), except that a PLA sheet (thickness: 0.3 mm) was used instead of the A-PET sheet.

Table 4 indicates results of evaluation of the film for a lid material.

Example 13

Sealing strength and adhesion strength of the film for a lid material obtained in the process of Example 2 were measured with methods similar to those in Example 12.

Table 4 indicates results of evaluation of the film for a lid material.

Comparative Example 13

Sealing strength and adhesion strength were measured with methods similar to those in Example 8, except that the film for a lid material obtained in the process of Comparative Example 1 was used.

Table 4 indicates results of evaluation of the film for a lid material. The film for a lid material was inferior in adhesion strength and sealing strength.

Comparative Example 14

Sealing strength and adhesion strength were measured with methods similar to those in Example 10, except that the film for a lid material obtained in the process of Comparative Example 1 was used.

Table 4 indicates results of evaluation of the film for a lid material. The film for a lid material was inferior in adhesion strength and sealing strength.

Comparative Example 15

Sealing strength and adhesion strength were measured with methods similar to those in Example 12, except that the film for a lid material obtained in the process of Comparative Example 1 was used.

Table 4 indicates results of evaluation of the film for a lid material. The film for a lid material was inferior in adhesion strength and sealing strength.

According to comparison between Examples and Comparative Examples of the present invention, it is clear that the resin compositions containing the ethylene-vinyl acetate copolymer having both VA and Qw specified in the present invention are superior in adhesion strength and sealing strength to the compositions containing the same amount of an ethylene-vinyl acetate copolymer alone which does not meet those VA and Qw or containing the same amount of a composition containing a plurality of such ethylene-vinyl acetate copolymers.

TABLE 1

| | Item | Ex 1 | Ex 2 | Ex 3 | Ex 4 | Ex 5 | Ex 6 | Ex 7 |
|---|---|---|---|---|---|---|---|---|
| Composition | Ethylene-vinyl acetate copolymer (A) | A-1 85 | A-1 85 | A-2 85 | A-2 85 | A-1 85 | A-1 85 | A-1 85 |
| | Tackifier resin (B) | B-1 15 | B-1 15 | B-1 15 | B-1 15 | B-1 15 | B-1 15 | B-1 15 |
| | Thermoplastic block copolymer (C) | — | C-1 3 | — | C-1 3 | C-1 3 | C-1 3 | C-1 3 |
| | Ethylene-α-olefin copolymer (D) | — | — | — | — | D-1 20 | — | — |
| | Low density polyethylene (E) | — | — | — | — | — | E-1 10 | — |
| | Ethylene-vinyl alcohol copolymer (F) | — | — | — | — | — | — | F-1 10 |
| Molecular weight distribution | Qw of (A) | 3.8 | 3.8 | 4.2 | 4.2 | 3.8 | 3.8 | 3.8 |
| | Right side of expression (1) | 5.9 | 5.9 | 5.2 | 5.2 | 5.9 | 5.9 | 5.9 |
| Adhesion target | — | A-PET | A-PET | A-PET | A-PET | A-PET | A-PET | A-PET |
| Evaluation result | Adhesion strength (N/15 mm) | 16 | 20 | 17 | 21 | 16 | 15 | 17 |
| | Bursting strength (kPa) | 25 | 30 | 25 | 30 | 40 | 30 | 35 |

TABLE 2

| | Item | Com Ex 1 | Com Ex 2 | Com Ex 3 | Com Ex 4 |
|---|---|---|---|---|---|
| Composition | Ethylene-vinyl acetate copolymer (A) | A-3 85 | A-4 85 | A-1 50 | A-1 97 |
| | Tackifier resin (B) | B-1 15 | B-1 15 | B-1 50 | B-1 3 |
| | Thermoplastic block copolymer (C) | — | — | — | — |
| | Ethylene-α-olefin copolymer (D) | — | — | — | — |
| | Low density polyethylene (E) | — | — | — | — |
| | Ethylene-vinyl alcohol copolymer (F) | — | — | — | — |
| Molecular weight distribution | Qw of (A) | 6.4 | 6.1 | 3.8 | 3.8 |
| | Right side of expression (1) | 5.2 | 4.6 | 5.9 | 5.9 |
| Adhesion target | — | A-PET | A-PET | A-PET | A-PET |
| Evaluation result | Adhesion strength (N/15 mm) | 13 | 13 | 20 | 6 |
| | Bursting strength (kPa) | 20 | 20 | 15 | 10 |

TABLE 3

| | Item | Com Ex 5 | Com Ex 6 | Com Ex 7 | Com Ex 8 | Com Ex 9 | Com Ex 10 | Com Ex 11 | Com Ex 12 |
|---|---|---|---|---|---|---|---|---|---|
| Composition | Ethylene-vinyl acetate copolymer (A) | A-5 85 | A-6 85 | A-7 85 | A-8 85 | A-9 85 | A-5 42.5 | A-5 42.5 | A-5 42.5 |
| | Ethylene-vinyl acetate copolymer (A) | — | — | — | — | — | A-6 42.5 | A-6 42.5 | A-6 42.5 |
| | Tackifier resin (B) | B-1 15 | B-1 15 | B-1 15 | B-1 15 | B-1 15 | B-1 15 | B-1 15 | B-1 15 |
| | Thermoplastic block copolymer (C) | — | — | — | — | — | — | C-1 3 | C-1 3 |
| | Ethylene-α-olefin copolymer (D) | — | — | — | — | — | — | — | D-1 40 |
| | Low density polyethylene (E) | — | — | — | — | — | — | — | — |
| | Ethylene-vinyl alcohol copolymer (F) | — | — | — | — | — | — | — | — |
| Molecular weight distribution | Qw of (A) | 5.8 | 4.7 | 5.4 | 3.5 | 4.3 | 6.5 | 6.5 | 6.5 |
| | Right side of expression (1) | 5.8 | 3.9 | 4.6 | 3.3 | 3.9 | 4.6 | 4.6 | 4.6 |
| Adhesion target | — | A-PET | A-PET | A-PET | A-PET | A-PET | A-PET | A-PET | A-PET |
| Evaluation result | Adhesions strength (N/15 mm) | 12 | 9 | 13 | 7 | 14 | 12 | 13 | 13 |
| | Bursting strength (kPa) | 20 | 25 | 20 | 15 | 25 | 20 | 20 | 30 |

TABLE 4

| | Item | Ex 8 | Ex 9 | Ex 10 | Ex 11 | Ex 12 | Ex 13 | Com Ex 13 | Com Ex 14 | Com Ex 15 |
|---|---|---|---|---|---|---|---|---|---|---|
| Composition | Ethylene-vinyl acetate copolymer (A) | A-1 85 | A-1 85 | A-1 85 | A-1 85 | A-1 85 | A-1 85 | A-3 85 | A-3 85 | A-3 85 |
| | Tackifier resin (B) | B-1 15 | B-1 15 | B-1 15 | B-1 15 | B-1 15 | B-1 15 | B-1 15 | B-1 15 | B-1 15 |
| | Thermoplastic block copolymer (C) | — | C-1 3 | — | C-1 3 | — | C-1 3 | — | — | — |
| | Ethylene-α-olefin copolymer (D) | — | — | — | — | — | — | — | — | — |
| | Low density polyethylene (E) | — | — | — | — | — | — | — | — | — |
| | Ethylene-vinyl alcohol copolymer (F) | — | — | — | — | — | — | — | — | — |
| Adhesion target | — | PS | PS | PP | PP | PLA | PLA | PS | PP | PLA |
| Evaluation result | Adhesion strength (N/15 mm) | 16 | 21 | 23 | 28 | 16 | 19 | 12 | 13 | 11 |
| | Bursting strength (kPa) | 25 | 35 | 35 | 40 | 25 | 30 | 20 | 20 | 20 |

TABLE 5

| Ethylene-vinyl acetate copolymer (A) | Vinyl acetate content (% by weight) | MFR (g/10 min) | Qw |
|---|---|---|---|
| A-1 | 5.0 | 1.0 | 3.8 |
| A-2 | 7.5 | 2.0 | 4.2 |
| A-3 | 7.5 | 2.0 | 6.4 |
| A-4 | 10 | 3.0 | 6.1 |
| A-5 | 5.5 | 8.5 | 5.8 |
| A-6 | 15 | 3.0 | 4.7 |
| A-7 | 10 | 9.0 | 5.4 |
| A-8 | 20 | 20 | 3.5 |
| A-9 | 15 | 14 | 4.3 |

While the present invention has been described in detail and with reference to specific embodiments, it will be apparent to those skilled in the art that various changes and modifications can be made without departing from the essence and scope of the present invention.

The invention claimed is:

1. A resin composition comprising:
an ethylene-vinyl acetate copolymer (A) in an amount of not less than 60 parts by weight and not more than 95 parts by weight, the ethylene-vinyl acetate copolymer (A) having a vinyl acetate content (VA) of not less than 3% by weight and not more than 13% by weight, and having a ratio Qw between a weight-average molecular weight (Mw) and a number-average molecular weight (Mn) of 1.5 or more and 4.5 or less; and
a tackifier resin (B) in an amount of not less than 5 parts by weight and not more than 40 parts by weight,
where a total amount of (A) and (B) is 100 parts by weight, and
the ethylene-vinyl acetate copolymer (A) satisfies a relational expression: $Qw < -1.9 \times \ln VA + 9.0$, where $\ln VA$ represents a natural logarithm of the vinyl acetate content VA.

2. The resin composition as set forth in claim 1, wherein an ethylene-vinyl acetate copolymer component in the resin composition is a single component.

3. A resin composition, comprising:
a resin composition recited in claim 1; and
a thermoplastic block copolymer (C) in an amount of not less than 0.5 parts by weight and not more than 5 parts by weight relative to 100 parts by weight of the resin composition recited in claim 1, the thermoplastic block copolymer (C) containing at least one of olefin and diolefin as a constitutional unit and containing aromatic vinyl hydrocarbon as a constitutional unit.

4. A resin composition, comprising:
a resin composition recited in claim 1; and
an ethylene-α-olefin copolymer (D) in an amount of not less than 5 parts by weight and not more than 100 parts by weight relative to 100 parts by weight of the resin composition recited in claim 1, the ethylene-α-olefin copolymer (D) having a density that is measured based on JIS K6922-1 (1998) and falls within a range of 860 kg/m3 or more and 910 kg/m3 or less.

5. A resin composition, comprising:
a resin composition recited in claim 1; and
low density polyethylene (E) in an amount of not less than 1 part by weight and not more than 50 parts by weight relative to 100 parts by weight of the resin composition recited in claim 1, the low density polyethylene (E) having a number-average molecular weight that falls within a range of 500 to 18000, and having a melting point that is measured based on JIS K6924-2 and falls within a range of 98° C. or more and 120° C. or less.

6. A resin composition, comprising:
a resin composition recited in claim 1; and
a saponified ethylene-vinyl acetate copolymer (F) in an amount of not less than 1 part by weight and not more than 100 parts by weight relative to 100 parts by weight of the resin composition recited in claim 1, the saponified ethylene-vinyl acetate copolymer (F) having a melting point that is measured based on JIS K6924-2 and is 90° C. or more and 120° C. or less.

7. A resin composition, comprising:
a resin composition recited in claim 1;
a thermoplastic block copolymer (C) in an amount of not less than 0.5 parts by weight and not more than 5 parts by weight relative to 100 parts by weight of the resin composition recited in claim 1, the thermoplastic block copolymer (C) containing at least one of olefin and diolefin as a constitutional unit and containing aromatic vinyl hydrocarbon as a constitutional unit; and
an ethylene-α-olefin copolymer (D) in an amount of not less than 5 parts by weight and not more than 100 parts by weight relative to 100 parts by weight of the resin composition recited in claim 1, the ethylene-α-olefin copolymer (D) having a density that is measured based on JIS K6922-1 (1998) and falls within a range of 860 kg/m3 or more and 910 kg/m3 or less.

8. A resin composition, comprising:
a resin composition recited in claim 1;
a thermoplastic block copolymer (C) in an amount of not less than 0.5 parts by weight and not more than 5 parts by weight relative to 100 parts by weight of the resin composition recited in claim 1, the thermoplastic block copolymer (C) containing at least one of olefin and diolefin as a constitutional unit and containing aromatic vinyl hydrocarbon as a constitutional unit; and
low density polyethylene (E) in an amount of not less than 1 part by weight and not more than 50 parts by weight relative to 100 parts by weight of the resin composition recited in claim 1, the low density polyethylene (E) having a number-average molecular weight that falls within a range of 500 to 18000, and having a melting point that is measured based on JIS K6924-2 and falls within a range of 98° C. or more and 120° C. or less.

9. A resin composition, comprising:
a resin composition recited in claim 1;
a thermoplastic block copolymer (C) in an amount of not less than 0.5 parts by weight and not more than 5 parts by weight relative to 100 parts by weight of the resin composition recited in claim 1, the thermoplastic block copolymer (C) containing at least one of olefin and diolefin as a constitutional unit and containing aromatic vinyl hydrocarbon as a constitutional unit; and
a saponified ethylene-vinyl acetate copolymer (F) in an amount of not less than 1 part by weight and not more than 100 parts by weight relative to 100 parts by weight of the resin composition recited in claim 1, the saponified ethylene-vinyl acetate copolymer (F) having a melting point that is measured based on JIS K6924-2 and is 90° C. or more and 120° C. or less.

10. The resin composition as set forth in claim 1, wherein the tackifier resin (B) is at least one resin selected from the group consisting of an aliphatic petroleum resin, an aromatic petroleum resin, an alicyclic hydrogenated petroleum resin, and a copolymer-based petroleum resin.

11. An adhesive agent for a sealant, said adhesive agent comprising a resin composition recited in claim 1.

12. The adhesive agent as set forth in claim 11, which is used for a container that is made of at least one material selected from the group consisting of polyethylene terephthalate, polystyrene, polypropylene, and polylactic acid.

13. A film for a lid material for a container, said film comprising at least two layers which include a layer containing a resin composition recited in claim 1 and a supportive base layer.

* * * * *